United States Patent
Dali et al.

[11] 3,720,462
[45] March 13, 1973

[54] MICROFICHE FILM READER

[75] Inventors: George J. Dali; William E. White, both of Rochester, N.Y.

[73] Assignee: Eastman Kodak Company, Rochester, N.Y.

[22] Filed: May 21, 1970

[21] Appl. No.: 39,188

[52] U.S. Cl. ................................. 353/27, 353/75
[51] Int. Cl. .................... G03b 23/08, G03b 21/22
[58] Field of Search ................. 353/25–27, 74–78

[56] References Cited

UNITED STATES PATENTS

| 3,566,524 | 3/1971 | Irasek | 353/27 |
| 2,767,610 | 10/1956 | Hintz | 353/27 |
| 2,701,979 | 2/1955 | Pratt | 353/27 |

FOREIGN PATENTS OR APPLICATIONS

| 671,930 | 12/1929 | France | 353/75 |

*Primary Examiner*—Leonard Forman
*Assistant Examiner*—A. J. Mirabito
*Attorney*—W. H. J. Kline, P. R. Holmes and L. F. Seebach

[57] ABSTRACT

A reader for microfiche transparencies having a plurality of images arranged thereon in an X-Y format comprises a housing in which a light-tight casing is arranged which carries a projection lens system, a mirror system and a viewing screen which encloses one side of the casing adjacent or facing an opening in the reader housing. The housing supports a lamp housing and a movable U-shaped member which carries a clamp means for engaging the transparency along an edge thereof. The U-shaped member moves the microfiche back and forth in one direction to intercept the optic axis and the clamp means moves the transparency in the other direction normal to the first direction to also intercept the optic axis. An actuating means is connected to the U-shaped member and to the clamp means so that the transparency can be moved in both directions simultaneously or independently in either one of the directions.

12 Claims, 14 Drawing Figures

GEORGE J. DALI
WILLIAM E. WHITE
INVENTORS

BY Lloyd F. Suebach

AGENT

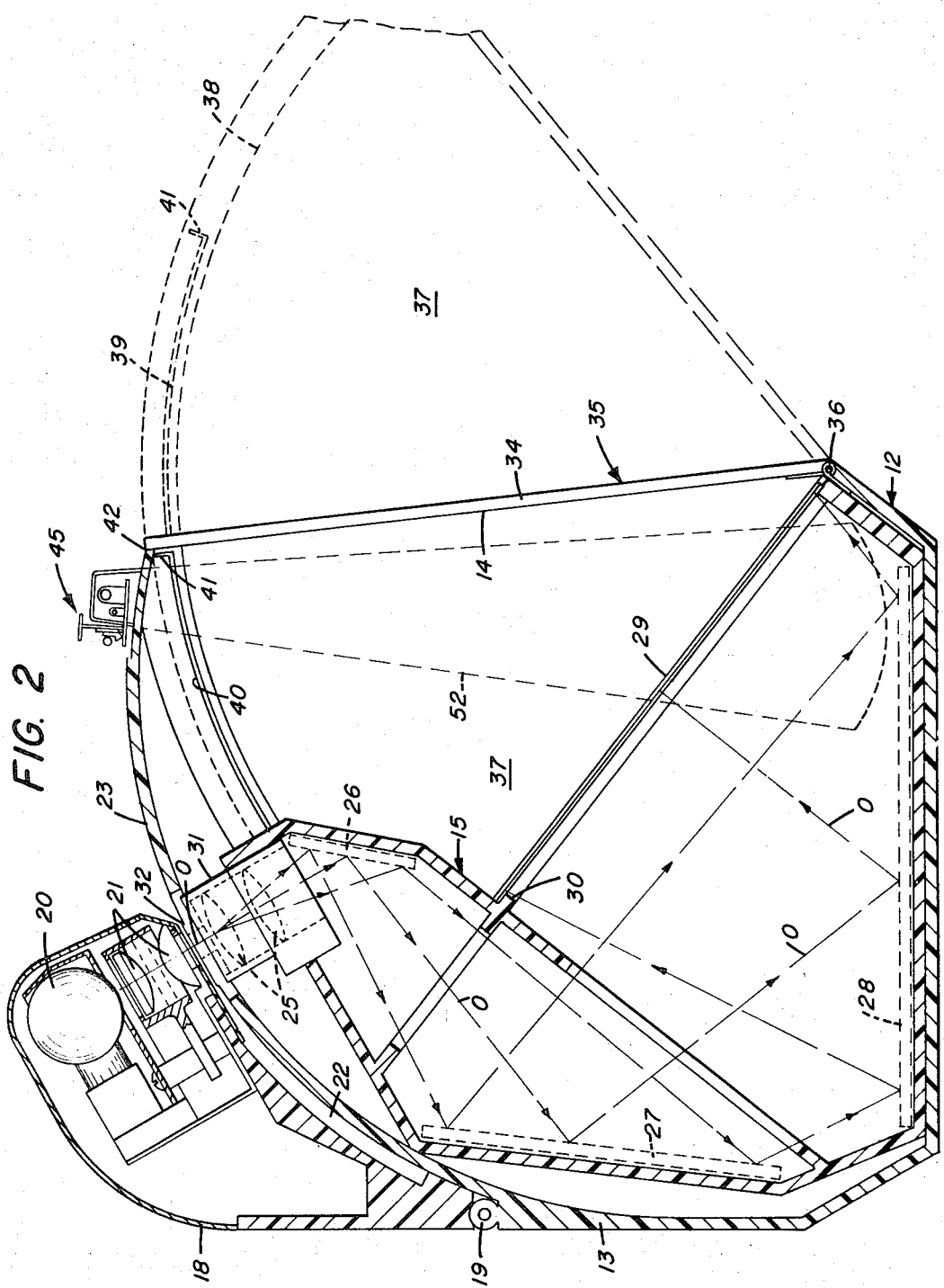

GEORGE J. DALI
WILLIAM E. WHITE
INVENTORS

BY Lloyd F. Auerbach

AGENT

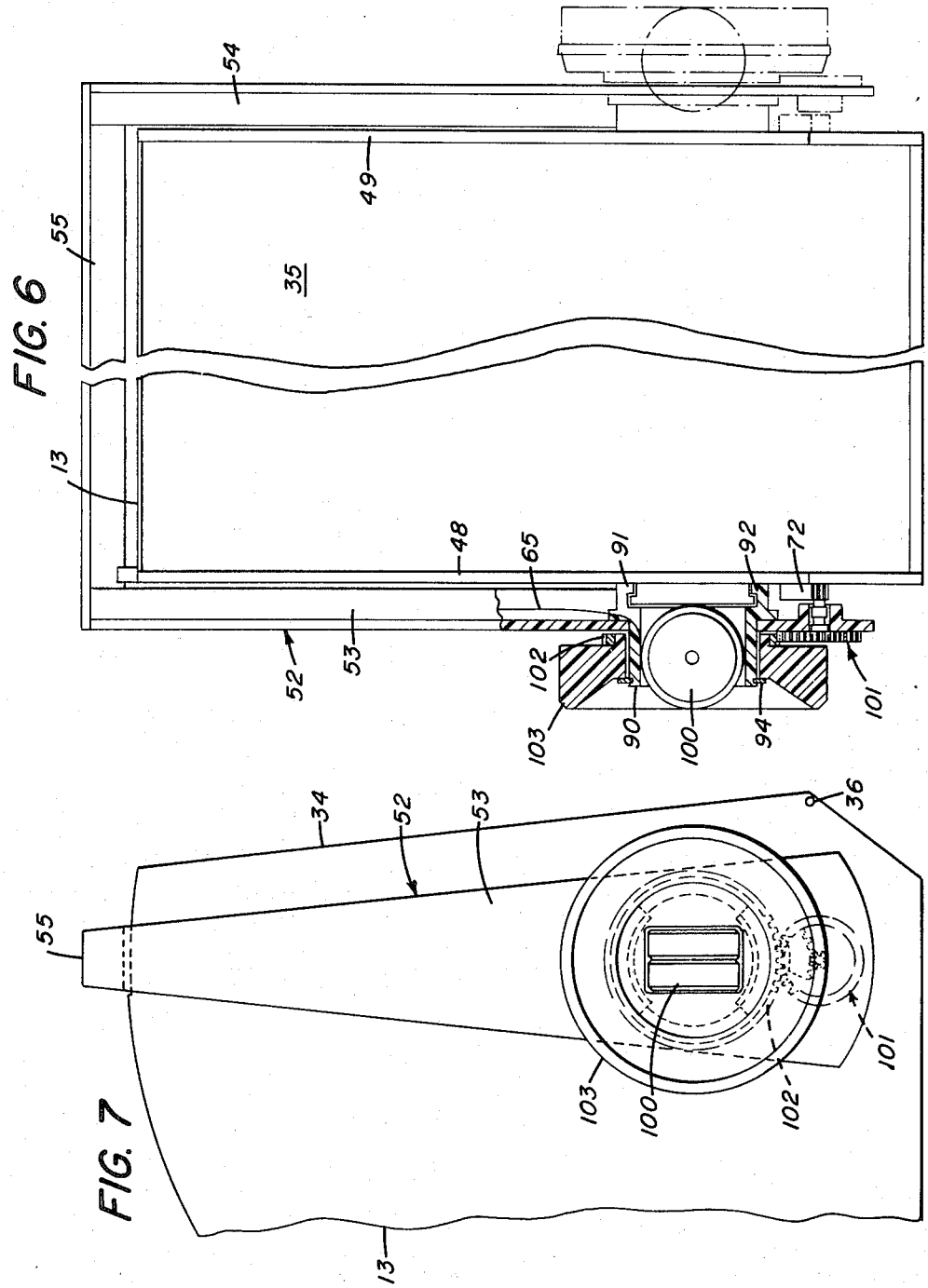

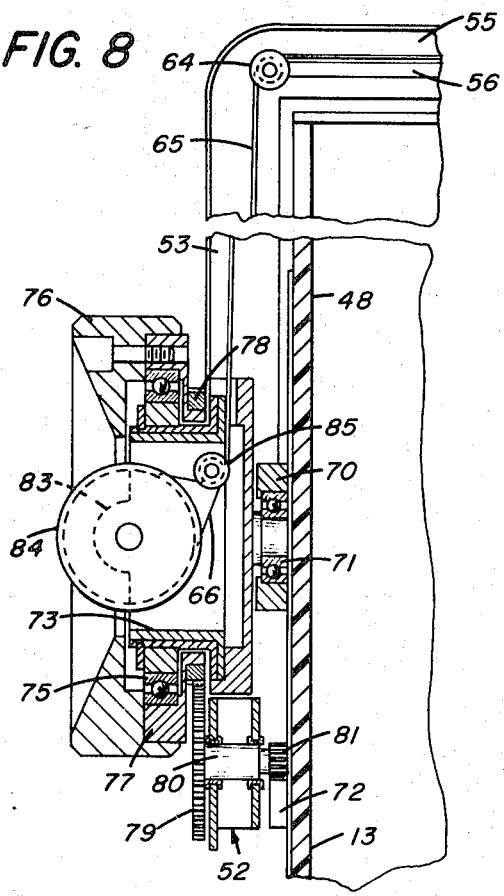
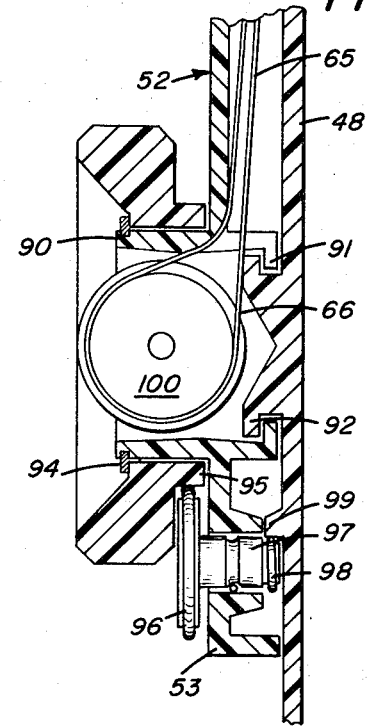
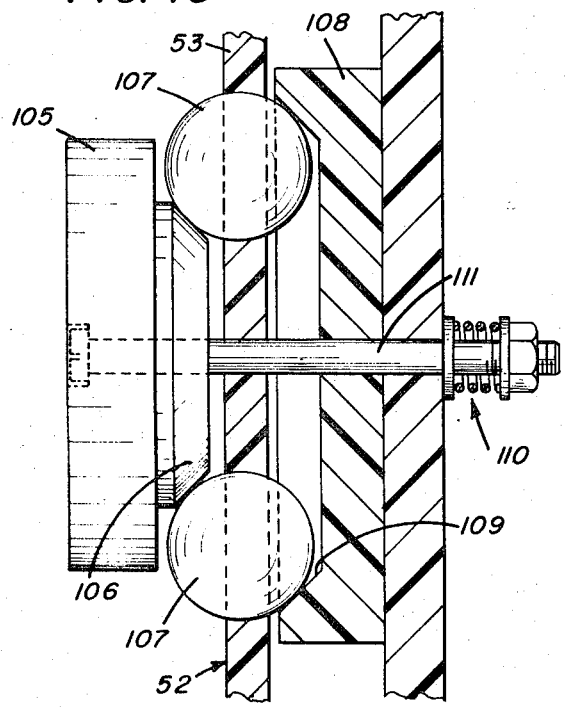
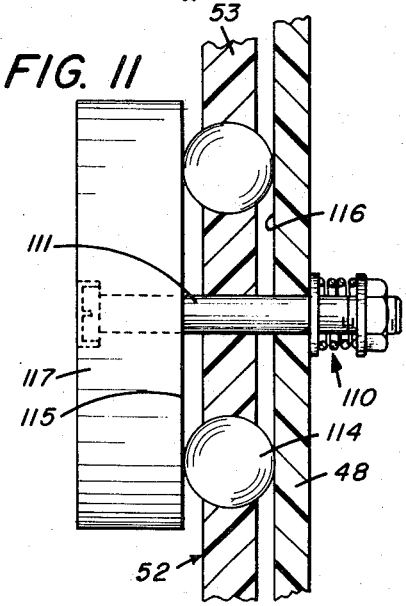

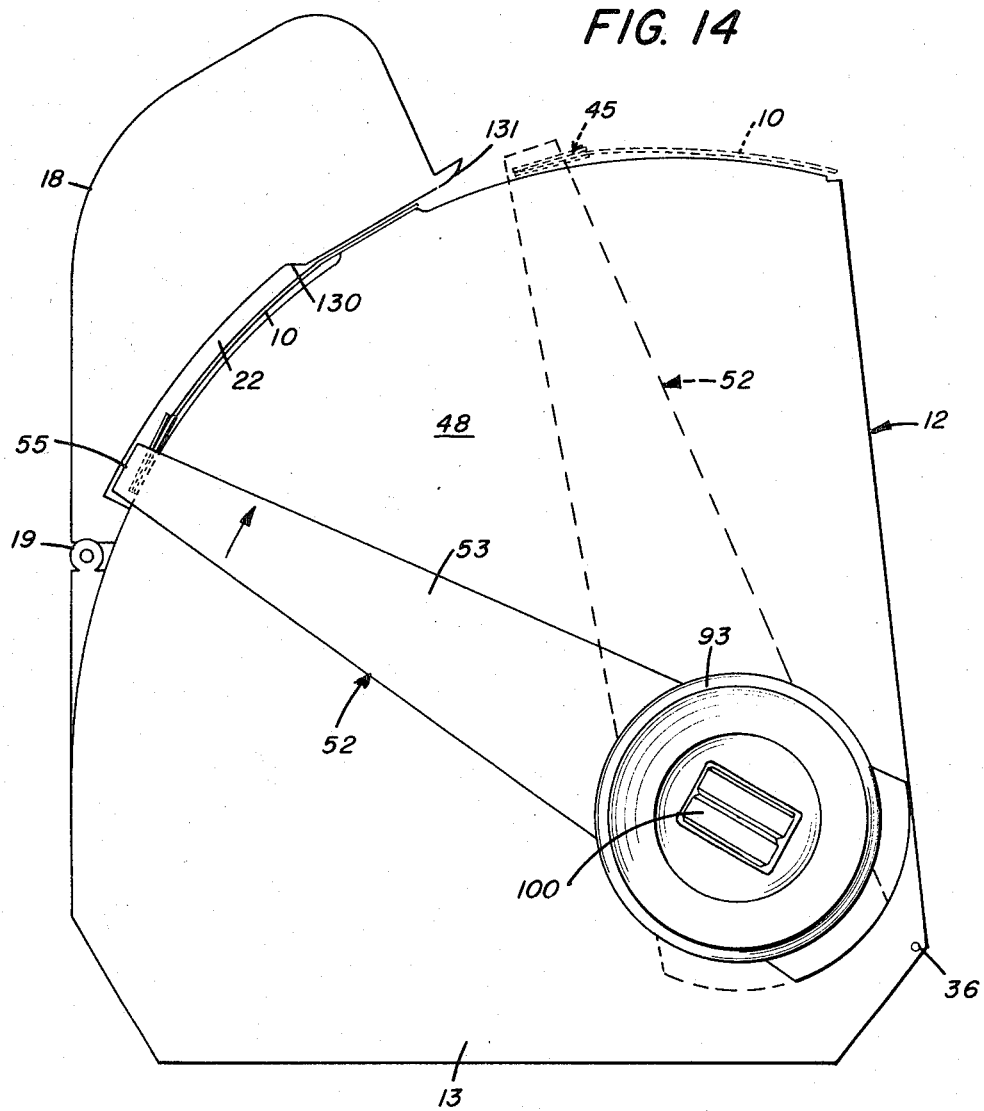

MICROFICHE FILM READER

FIELD OF THE INVENTION

The invention relates to a film reader for microfiche transparencies having a plurality of images arranged thereon in an X-Y format and, more particularly, to a film reader in which the microfiche is moved relative to an optic axis without being clamped or supported in a movable carrier.

DESCRIPTION OF THE PRIOR ART

Film readers for projecting an image onto a screen in which the image is contained on a filmstrip or a microfiche are well known in the art. With respect to film readers used in conjunction with microfiche transparencies, the transparency is usually mounted on or in a carrier which can be moved relative to the optic axis to position any one of the micro images in relation to the optic axis. In most instances, the microfiche carrier is slidably mounted for movement relative to the optic axis. The microfiche per se is usually arranged between glass flats to maintain the microfiche in a flat plane throughout its complete movement to locate a particular image. As a result, the carrier, its supporting structure and moving mechanism have become rather complex in order to facilitate location of an image and to provide ease of location of the image by the viewer.

In the film reader disclosed with respect to the invention described and claimed hereinafter, a relatively simple and compact microfiche reader is obtained by moving as few parts as possible relative to the optic axis and at the same time maintaining the microfiche in a relation to the surface over which the microfiche is being moved so as to reduce and eliminate any abrasion of the microfiche. In this particular case, a very simple mechanism provides both directions of movement for the microfiche with ease of operation by the viewer. In view of the optical system that is used, a very low wattage lamp can be used so that a blower is not required for cooling the optical system or the area of the transparency directly aligned with the optic axis. This elimination of the blower permits the film reader to be made much smaller than would be otherwise required. Also, by moving the microfiche over an exterior surface of the housing, the size of the housing can be reduced because the size is not then determined by the necessary overall movement of the microfiche.

SUMMARY OF THE INVENTION

A primary object of the invention is to provide a small and compact microfiche reader which provides an optimum quality image and extreme ease of operation.

Another object of the invention is to provide a microfiche reader in which the microfiche can be moved with a rectilinear motion relative to the optic axis of the projection system, either in both directions simultaneously, or independently in one or the other direction.

Another object of the invention is to provide a microfiche reader which is reduced in size because the microfiche is moved over an outer surface of the reader housing rather than completely within the housing, thereby requiring less space for the moving mechanism.

These and other objects and advantages of the invention will be apparent to those skilled in the art by the description which follows.

The objects of the invention are attained by providing a housing in which a light-tight casing is arranged which carries a projection lens system, a mirror system and a viewing screen which encloses one side of the casing adjacent or facing an opening in the reader housing. The housing supports a lamp housing and a movable U-shaped member which carries a clamp means for engaging the transparency along an edge thereof. The U-shaped member moves the microfiche back and forth in one direction to intercept the optic axis and the clamp means moves the transparency in the other direction normal to the first direction to also intercept the optic axis. An actuating means is connected to the U-shaped member and to the clamp means so that the transparency can be moved in both directions simultaneously or independently in either one of the directions. The actuating means in a preferred embodiment comprises a knob freely rotatable on the U-shaped member and a second knob rotatably mounted on the U-shaped member and relative to the first knob so that they can be actuated simultaneously or independently of one another.

DESCRIPTION OF THE DRAWINGS

Reference is now made to the accompanying drawings wherein like reference numerals and characters designate like parts and wherein:

FIG. 2 is a vertical sectional view through the reader shown in FIG. 1 and discloses the relationship of an optical system and viewing screen to an opening in the film reader housing and the various positions of a hood and cover relative to the opening;

FIG. 6 is a partial vertical sectional view of a mechanism for moving the microfiche and discloses an embodiment that can be interchangeably mounted so that movement of the microfiche can be made by either the right or left hand of the viewer;

FIG. 7 is a partial side elevational view of the mechanism shown in FIG. 6;

FIGS. 8–13 are vertical sectional views of various mechanisms by which the microfiche can be moved relative to the optic axis; and FIG. 14 is a side elevational view of another embodiment of the invention in which the scanning movement of the microfiche in one direction is opposite to that shown in FIG. 1.

DESCRIPTION OF THE PREFERRED EMBODIMENTS

Figure 4:
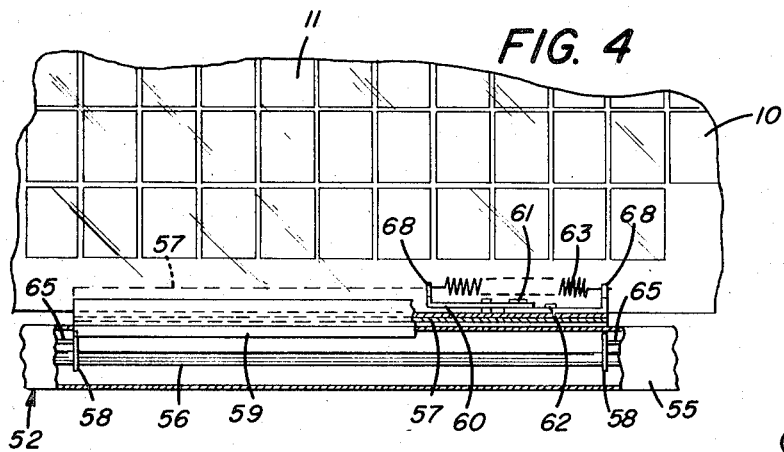
FIG. 4 is a partial plan view showing the manner in which the clamp means of FIG. 3 is arranged for engaging an edge of the microfiche.

Reference is made particularly to FIG. 4 to describe a microfiche 10 as used in the reader embodying the invention. Such a microfiche 10 comprises a transparent film having a plurality of images 11 arranged thereon in an X-Y format. Depending on the magnification of the optical system of the reader, all or a part of an image 11 can be positioned relative to an optic axis O for projection of a part of the image or of the full image onto a screen. Inasmuch as the film reader about to be described in detail is of a small and compact size, only a portion of an image area is actually projected onto the screen. However, this disclosure is not meant as a limitation with respect to the invention in that the invention can be used in and is also and equally applicable to a reader in which a full image will be projected onto the screen.

With reference to FIG. 2, the actual structure of the film reader is much more evident. The film reader, generally designated by the numeral 12, comprises a housing 13 which has a front opening 14 and within which a casing 15 is arranged. A lamp housing 18 is attached to or pivotally mounted on the housing 13 at 19 and, as is well known in the art, carries a lamp 20 and a condenser lens system 21. In a space 22 between the lamp housing 18 and an arcuate surface 23 of housing 13, the microfiche 10 is moved as described hereinafter to locate a desired image 11 with respect to the optic axis O.

The optical system, arranged in casing 15, generally comprises a projection lens system 25 and an arrangement of front surface reflecting mirrors as shown in FIG. 2 designated by the numerals 26, 27 and 28. A viewing screen 29 covers an opening 30 in the front face of casing 15 as shown in FIG. 2. The mount 31 for the projection lens system 25 is provided with a cap 32, which is made of Teflon and serves as a locating surface for the microfiche 10 when the desired image 11 is located and positioned relative to the optic axis O. In addition, the cap 32 serves to hold the microfiche 10 away from surface 23 so as to reduce abrasion due to the movement of the microfiche. From FIG. 2 it will be evident that the projection lens system 25 and mirrors 26, 27 and 28 are so contained within casing 15 so as to be dust-proof which enhances the projected image presented on the screen 29.

The opening 14 in housing 13 is covered by a plate 34 forming a part of a hood 35 that is pivotally mounted on housing 13 at 36. The hood 35 is provided with circular-sector-shaped side plates 37 which prevent any ambient light from reaching the screen 29 that might be incident thereon from the sides of the reader. In addition, the opening 38 formed by plate 34 and side plates 37, when the hood is in an open position as shown by the dotted lines in FIG. 2, can be adjusted lengthwise as viewed in FIG. 2 by a slidable plate 39. Each of side plates 37 is provided with a recess 40 in which plate 39 is slidable. The opening 38 is then determined by the position of lip 41 on plate 39 relative to the edge 42 of plate 34, the width remaining fixed. With this arrangement, the amount of any overhead ambient light that might be incident on screen 29 can be controlled by the viewer.

Figure 1:
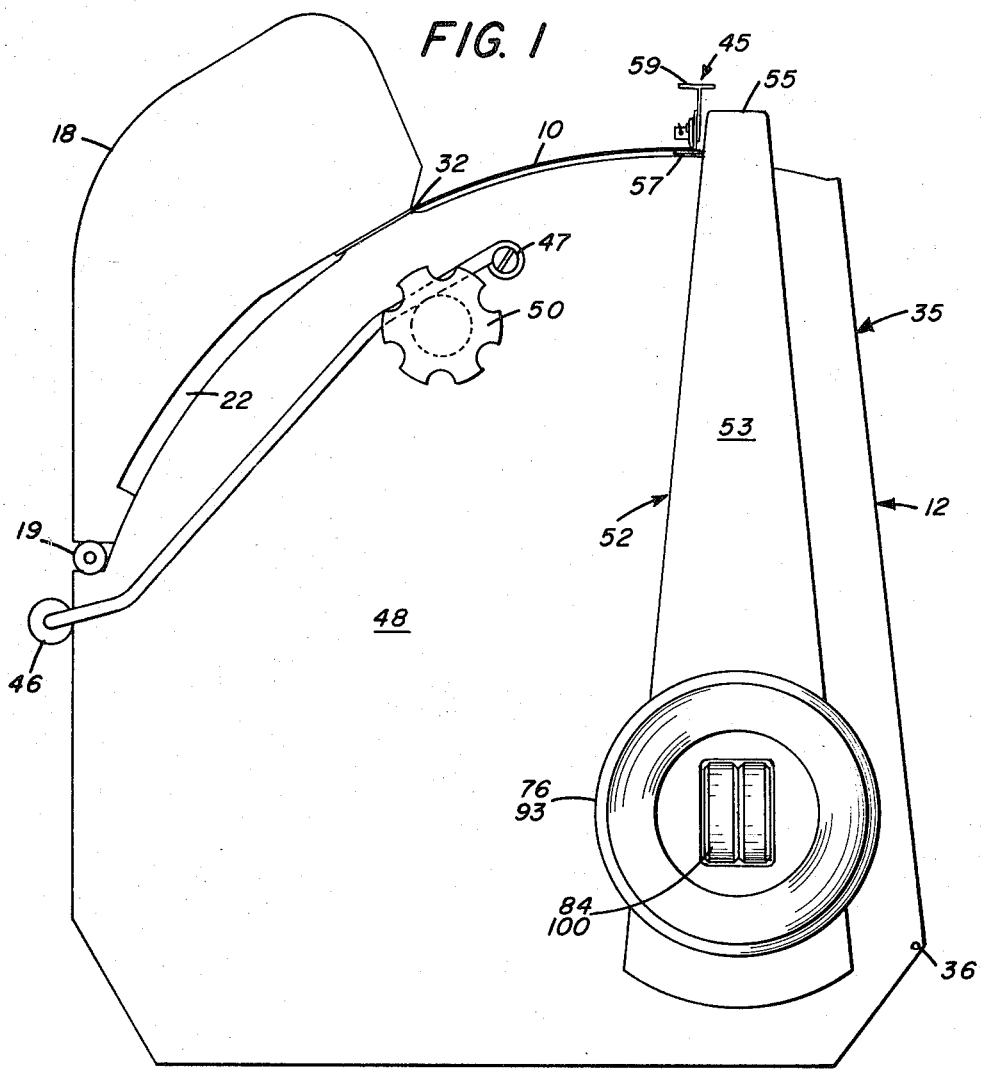
FIG. 1 is a side elevational view of a microfiche film reader embodying the invention.

As shown in FIGS. 1 and 2, the space 22 extends toward the pivot 19 to permit the microfiche 10 to be moved to the left along surface 23 a distance sufficient to place the row of images adjacent a clamp means 45 (see FIG. 4) in alignment with the optic axis O. The housing 13 carries a handle 46 that is pivotally mounted on the housing 13 on the spaced side walls 48 and 49 thereof by means of screws 47. A knob 50 is rotatably mounted on wall 48 and is connected in a manner not shown to the projection lens mount 31 for moving it so as to focus the projected image on screen 29.

A U-shaped member 52 which has the form of a bail comprises arms 53 and 54 and a cross bar 55. The cross bar 55 carries a rod 56 on which the clamp means 45 is slidably mounted as a unit.

Figure 3:
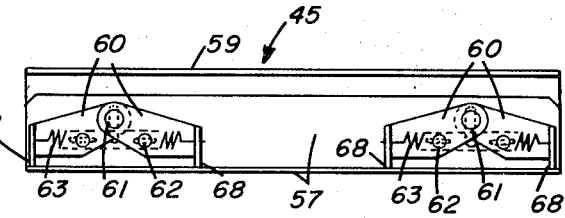
FIG. 3 is a front elevational view of a clamp means for a microfiche.

The clamp means 45, see FIGS. 3 and 4, comprises an inverted T-shaped member 57, the cross bar of which carries an ear 58 at each end for engaging rod 56, an actuator bar 59 slidably mounted on one side of the leg of member 57, and a pair of toggle-type grippers 60 at each end and on the other side of the legs of member 57, each pair of grippers being connected to bar 59 at their respective ends through a common pin and slot arrangement 61 and each gripper being pivotally mounted on the leg of member 57 by a pin and slot arrangement 62. The grippers 60 in each pair are urged toward one another about their respective pivots 61 by means of a spring 63. Each of grippers 60 is provided at the end thereof with a sharp nose 68 for engaging the microfiche 10 along an edge thereof, as shown in FIG. 4. A small pulley 64 is arranged at the junction of each of arms 53 and 54 and the cross bar 55, one of which is shown in FIG. 8. A length of nylon cord or steel cable 65 has its ends secured to the ears 58 of plate 57 and forms a loop 66 which encircles an actuating member or knob 84 for a purpose to be described hereinafter. With reference to FIGS. 4 and 8, the loop 66 is formed by fixing one end of cable 65 to ear 58, extending the cable to the left, encircling a pulley 64 and returning it across arm 55 to the right so it encircles the other pulley 64 along with the portion of cable 65 that has its end attached to the other ear 58.

The U-shaped member 52 is preferably located as shown in FIG. 1 for receiving a microfiche 10. When in this position, the actuator bar 59 is pushed downward and through the pin and slot connections 61, each of grippers 60 is pivoted so as to raise their respective noses 68. While the actuator bar 59 is held in this position, an edge of the microfiche is inserted under noses 68 and against plate 57. Bar 59 is then released and the noses 68 then engage and hold the microfiche so as to be movable with clamp means 45 as described hereinafter.

Reference is now made to FIGS. 8–13 in which actuating means for the U-shaped member 52 and clamp means 45 are disclosed. With reference to FIG. 8, a cylindrical extension 70 on walls 48 and 49 carries a bearing 71 which, in turn, supports the U-shaped member 52. The axis of rotation of bearing 71 is the axis of rotation of the U-shaped member 52 as well as the center of curvature of arcuate surface 23. Below the bearing 71, a gear segment 72 is fixed to wall 48. The U-shaped member 52 is provided with a group of concentric sleeves 73, one of which carries a bearing 75 on which a knob 76 is freely and rotatably mounted. The knob 76 includes a ring 77 on and to which is secured a gear 78. The gear 78 meshes with a gear 79 which is fixedly mounted on or integral with a stud shaft 80 which also carries a pinion 81 that engages the gear segment 72.

As the knob 76 is rotated, the gear 78 is rotated therewith and imparts rotation to gear 79 and pinion 81. Since gear segment 72 is fixed to side wall 48 and stud shaft 80 is carried by U-shaped member 52, the latter is moved about the axis of bearing 71, whereby cross bar 55, clamping means 45 and a microfiche 10 are moved toward or away from the lamp house 18 in accordance with the direction of rotation of knob 76. One of sleeves 73 is provided with bearing portions 83 between which a second knob 84 is rotatably mounted. This same sleeve carries a pulley 85 which serves to guide cable 65 and, as seen in FIG. 8, the loop 66 of cable 65 encircles knob 84. As knob 84 is rotated in either direction, the clamp means 45 will be moved along rod 56 which is in a direction normal or perpendicular to that in which the U-shaped member 52 is moved by knob 76. With this arrangement the U-shaped member 52 and clamp means 45 are moved independently of one another. However, with the knobs 76 and 84 arranged as shown in FIG. 8, both knobs can be manipulated or rotated simultaneously to effect movement of both the U-shaped member 52 and the clamp means 45.

In FIG. 9, another embodiment of an actuating means is disclosed and presents a somewhat simpler arrangement than that shown in FIG. 8. In this arrangement, each of arms 53 and 54 of the U-shaped member 52 is provided with a cylindrical sleeve 90 the inner portion of which is part of a bayonet lock arrangement 91 and engages a corresponding mating part 92 that is part of or integral with the wall 48 of housing 13. A knob 93 is freely rotatable on the outer portion of sleeve 90 and retained in position thereon by a suitable lock washer 94. A cylindrical extension or shoulder 95 on knob 93 engages a rubber roller 96 carried by a stud shaft 97 and which is integral with or carries another rubber roller 98 which engages an arcuate lip 99 on wall 48. The sleeve 90 carries a knob 100 which receives the loop 66 of cable 65 in much the same manner as described in connection with the embodiment shown in FIG. 8. The action obtained with this embodiment of an actuating means is similar to that described with respect to FIG. 8; namely, rotation of knob 93 moves the U-shaped member 52 about the axis of sleeve 90 and knob 100 moves the clamp means 45 across the surface 23 of housing 13. Again, both knobs 93 and 100 can be manipulated simultaneously to obtain movement of the microfiche 10 in both directions.

In the embodiment of the actuating means described hereinabove with respect to FIGS. 8 and 9, the drive system between the knobs 76 and 93 is such that a large angular rotation of either knob will produce a much smaller linear movement of the microfiche in both directions relative to the optic axis O. Also, the drive systems provide for movement of the microfiche in the same relative directions that the knobs are rotated.

The actuating means disclosed in FIG. 9 is particularly adaptable to a U-shaped member or bail that can be molded of plastic material. This is shown in FIGS. 6 and 7 in which the U-shaped member 52 can be mounted interchangeably with the knob 93 on either the right hand or left hand side of the housing 13. With this arrangement, the viewer can mount the actuating means for operation in accordance with the hand that will provide the easiest manipulation. However, such an arrangement necessitates a clamp means that will extend from either side of the cross bar 55 in order to make the unit completely interchangeable. It will be noted that a gear drive 101 interconnects a gear 102 on a knob 103 to U-shaped member 52, as in FIG. 8.

Figure 12:
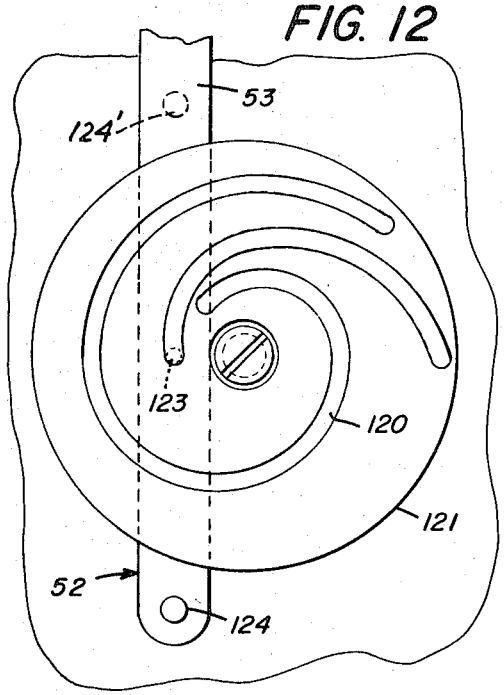
Figure 13:
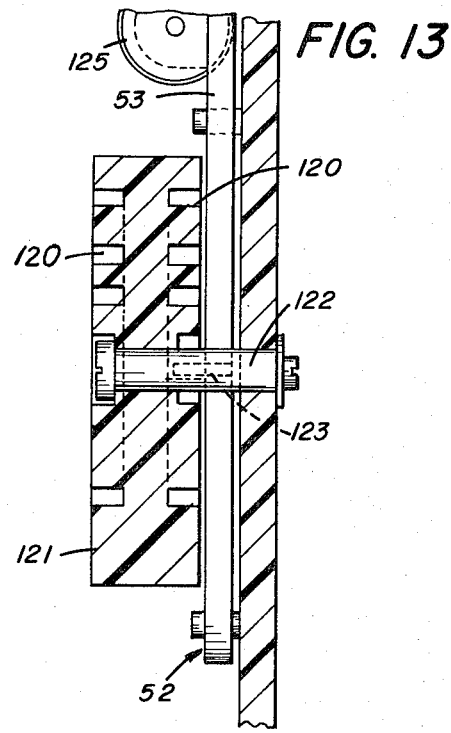
Figure 5:
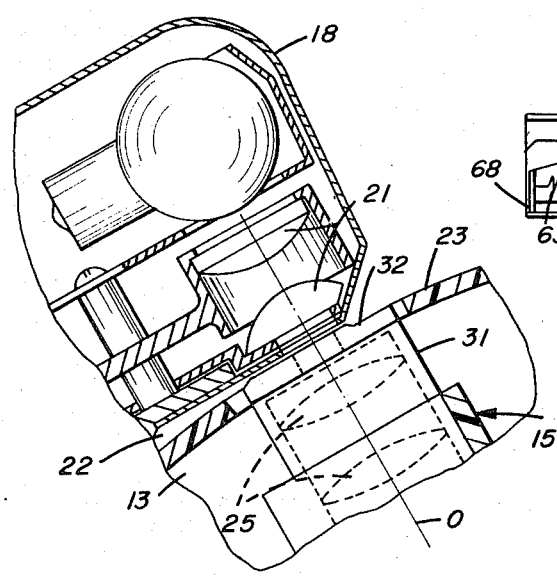
FIG. 5 is a partial sectional view showing the condenser lens system and the optic axis with respect to which an image is located for projection onto the screen.

In FIGS. 10-13, the ratio of movement of the actuating mean to that of the microfiche is obtained by means other than a gear or friction drive. In FIG. 10, a knob 105 is provided with an angular face 106 which is engaged by the surfaces of a pair of spaced balls 107 which, in turn, are carried by arm 53 of the U-shaped member 52. A plate 108 having an angular face 109 also engages the balls. The angular faces 106 and 109 are maintained in frictional engagement with the balls by the spring arrangement 110 associated with the mounting stud 111. Consequently, angular movement or rotation of knob 105 is transmitted through the balls 107 to the U-shaped member 52. The arrangement shown in FIG. 11 is similar to that shown in FIG. 10 except that the balls 114 engage the parallel faces 115 and 116 of the knob 117 and the side wall 48, respectively. In FIGS. 12 and 13, an embodiment is disclosed in which cam slots or grooves 120 are formed in both faces of a knob 121 which is freely rotatable on a stud 122. The cam slots 120 allow selection of two different rates of movement and mounting of the knob on either of walls 48 or 49. A pin 123 carried by either or both of arms 53 and 54 serves to engage the selected set of slots 120 for moving U-shaped member 52 which can be pivotally mounted at 124 or 124' on walls 48 and 49. In FIGS. 10-13, a structure similar to that shown in FIGS. 8 and 9 can be incorporated therein for moving the clamp means 45. For example, a knob 125 can be rotatably mounted on the arm 53 just above knob 121 as shown in FIG. 13.

With respect to FIG. 14, another embodiment of the film reader is shown in which the U-shaped member 52 is moved in an opposite sense for positioning an image 10 relative to the optic axis O. In this case, the lamp house 18 is pivotally mounted at 19 as described above but the space 22 must be sufficient to permit the cross bar 55 to be moved freely not only under the lamp house 18 but also to a position outside of the lamp house, as shown by the dotted lines. The clamp means 45 can be a pair of spring plates between which the microfiche 10 can be inserted and frictionally retained. In order to position the microfiche 10 in the clamp means 45, it is necessary that the cross bar 45 be in the position indicated by the dotted lines so as to permit easy access to the clamp means for insertion and removal of the microfiche. The lamp house 18 can be provided with cam surfaces 130 and 131 which, upon being struck by the cross bar 55, cause the lamp housing to pivot slightly to permit the cross bar to pass therebeneath, either to an inside position as shown in full lines in FIG. 14, or an outside position as shown by the dotted lines in which the microfiche can be removed from or inserted into the clamp means 45. The means for actuating the clamp means 45 and the U-shaped member 52 can be generally the same as that already described. However, it can be readily appreciated that in either embodiment of the film reader described herein, the microfiche 10 is moved back and forth over a curved surface in the one direction.

The invention has been described in detail with particular reference to preferred embodiments thereof, but it will be understood that variations and modifications can be effected within the spirit and scope of the invention.

We claim:

1. In a film reader having an illuminating system and an optical system defining an optic axis, said optical system being arranged within a housing and relative to a rear projection screen in said housing for projecting at least a part of any one of a plurality of images arranged in an X–Y format on a transparency onto said screen, said housing being provided with an external arcuate surface having an aperture aligned with said optic axis and over which surface said transparency is movable, the improvement comprising:

a movable U-shaped member having its legs pivotally connected to said housing and the cross bar thereof extending across the surface of said housing for back and forth movement in one direction;

clamp means for engaging said transparency along an edge thereof and slidably mounted on said cross bar for back and forth movement in an other direction normal to said one direction; and actuating means operatively connected to said U-shaped member and to said clamp means for moving the same simultaneously or independently of one another, thereby moving said transparency over said arcuate surface relative to said optic axis and between said systems to position a selected one of said images relative to said optic axis.

2. A film reader in accordance with claim 1 wherein said U-shaped member is pivotally mounted relative to the center of curvature of said arcuate surface.

3. A film reader in accordance with claim 1 wherein said clamp means comprises two pair of spaced toggle members slidably mounted on said cross bar.

4. A film reader in accordance with claim 1 wherein said actuating means comprises a knob freely and rotatably mounted on said U-shaped member and with respect to the center of curvature of said arcuate surface and operatively connected to said U-shaped member for moving the same over said arcuate surface in said one direction.

5. A film reader in accordance with claim 4 wherein said knob is operatively connected to said U-shaped member through a drive system.

6. A film reader in accordance with claim 5 wherein said drive system comprises a gear train positively interconnected with a gear segment on said housing.

7. A film reader in accordance with claim 5 wherein said drive system comprises a train of frictionally driven members interconnected with an arcuate stationary lip on said housing.

8. A film reader in accordance with claim 7 wherein said frictionally driven members comprise at least a pair of spherical drive members frictionally engaging said knob, said U-shaped member and said housing.

9. A film reader in accordance with claim 1 wherein said actuating means comprises a first movable member operatively connected to said U-shaped member for moving the latter in said one direction and a second movable member operatively connected to said clamp means for moving the latter in said other direction, said movable members being arranged relative to one another so as to be operable jointly or severally.

10. A film reader in accordance with claim 9 wherein said first movable member comprises a first knob and said second movable member comprises a second knob rotatably mounted on said U-shaped member and relative to said first knob so as to be actuated therewith or independent thereof.

11. A film reader in accordance with claim 10 wherein said second knob is interconnected by a cable to said clamp means for moving the latter back and forth in said other direction.

12. A film reader in accordance with claim 9 wherein said first movable member is freely and rotatably mounted on said U-shaped member and said second movable member is rotatably mounted on said U-shaped member and movable therewith.

* * * * *